Nov. 11, 1969 R. W. HOUSMAN 3,477,725
RECORDING TRACK INDICATING WHEEL FOR MAGNETIC
TAPE CARTRIDGE PLAYER
Filed Aug. 22, 1966

INVENTOR.
ROBERT W. HOUSMAN
BY
Wolf, Greenfield & Hieken
ATTORNEYS

United States Patent Office 3,477,725
Patented Nov. 11, 1969

3,477,725
RECORDING TRACK INDICATING WHEEL FOR MAGNETIC TAPE CARTRIDGE PLAYER

Robert W. Housman, Winthrop, Mass., assignor to Radio Manufacturing Co., Inc., Melrose, Mass., a corporation of Massachusetts Filed Aug. 22, 1966, Ser. No. 574,151
Int. Cl. G11b 5/78
U.S. Cl. 274—4 2 Claims

ABSTRACT OF THE DISCLOSURE

In a cartridge tape player the particular channel being played is displayed through a window opposite a wheel that is advanced by the back stroke of a solenoid each time the solenoid changes, by means of its forward stroke, the head scanning position to scan the next channel.

The present invention relates in general to recording track indicating and more particularly concerns novel apparatus and techniques for providing a visual indication of the track then being scanned by multiple track magnetic tape scanning apparatus.

According to the invention, there is transducing means for scanning one of a plurality of parallel tracks on a recording medium, means for selectively positioning the transducing means to scan a selected one of the recording tracks and means responsive to the selective positioning of the transducing means for providing a visible indication of the track then being scanned.

In a specific form of the invention there is a magnetic head for scanning a selected track (or pair of tracks for stereo) and pulsed solenoid means for stepping the head to scan another track (or pair) and correspondingly stepping indicating means so that the channel then being scanned is visible to the user.

Automobile tape reproducing apparatus has met with wide acceptance because such apparatus provides a listener with uninterrupted programs chosen by the listener reproduced with high quality. Especially popular are the eight-track units whereby four channels of stereo program material may be recorded upon a single length of magnetic tape. Typically these units are so arranged that upon completion of scanning the entire length of the tape, the head is stepped by one to scan the next channel, the head being reset to scan the first channel upon completion of scanning the last. One shortcoming of these units is that the user has no indication of which channel is then being scanned. The head itself is usually invisible, and even if it were visible to the user, the slight displacement in head position required for scanning a different channel would be too little to serve as a practical indication of the channel then being scanned.

Accordingly, it is an important object of this invention to provide a means for clearly visibly indicating to a user the portion of the recording medium then being scanned.

It is another object of the invention to achieve the preceding object in apparatus using multiple parallel channels on magnetic recording tape so that the user knows which channel is then being scanned.

It is a further object of the invention to achieve the preceding object reliably and with relatively inexpensive apparatus.

It is a more specific object of the invention to achieve the preceding objects with essentially the same source of mechanical energy functioning to both step a scanning head to scan a different channel and effect a change in the indication of the channel then being scanned.

Figure 1:
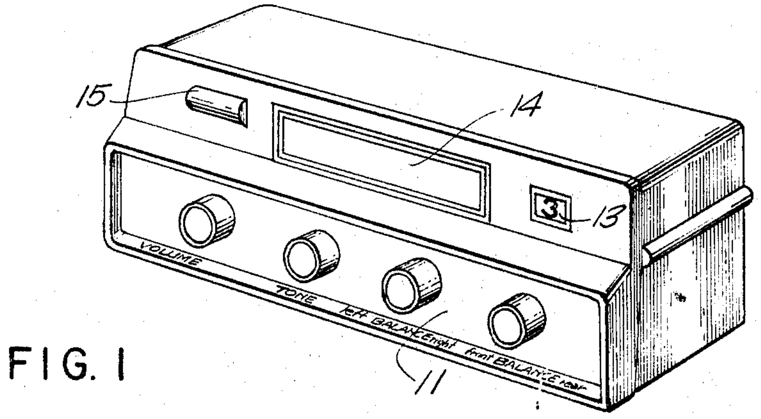
Figure 2:
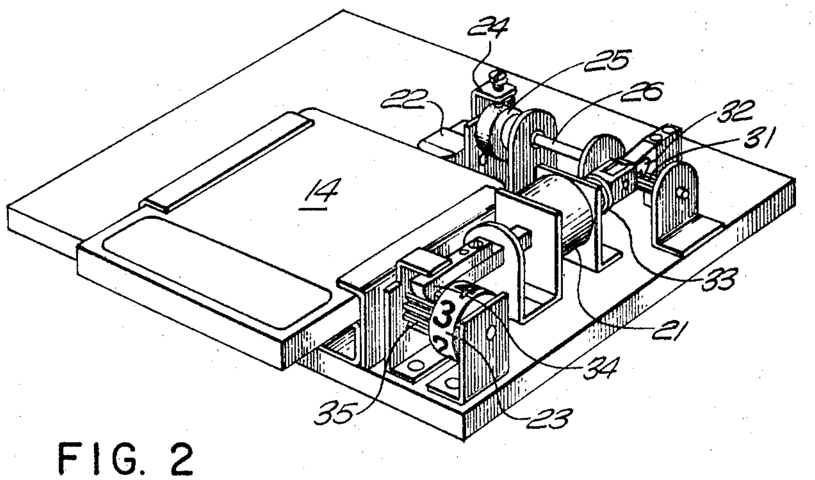

Numerous other features, objects and advantages of the invention will become apparent from the following specification when read in connection with the accompanying drawing in which:

FIG. 1 is a perspective view of a vehicular tape reproducer embodying the principles of the invention; and FIG. 2 is a perspective view of an embodiment of the invention in a tape reproducer with portions of the tape reproducer not associated with the invention not shown so as not to obscure the principles of the invention.

With reference now to the drawing and more particularly FIG. 1 thereof, there is shown a perspective view of a vehicular tape reproducer embodying the principles of the invention. The reproducer includes front panel controls for volume, tone, left-right balance and front-rear balance on the front panel 11 as indicated, and an indicator window 13 in which the number 3 is shown displayed to indicate that channel 3 is then being scanned in accordance with the principles of the invention. A pilot light (not shown) may indicate when the unit is on and illuminate window 13. The tape recording is typically on a multiple track tape in an easily insertable and removable cartridge 14 preferably arranged so that insertion of the cartridge turns the apparatus on and removal of the cartridge turns the apparatus off. The apparatus also is preferably of the type whereby the channel scanned is stepped in response to completion of each scan of the entire tape length or by actuating the change channel switch 12. Since the specific means for providing this type of operation is known in the art and not a part of the invention, it is not discussed in detail herein.

Referring to FIG. 2, there is shown a perspective view of an embodiment of the invention. Each time solenoid 21 is pulsed, it steps transducing head 22 to scan a different channel on the tape in cartridge 14 and positions channel indicator wheel 23 so that the channel then being scanned is displayed in window 13. To this end head 22 is carried by a head support 24 that rides on a cam 25 to control the vertical position of head support 24 and consequently head 22, typically to any one of four positions. For details of a specific camming arrangement for positioning a head reference is made to copending application Ser. No. 498,289 now patent number 3,372,937 filed Oct. 20, 1965 of Frank B. Flint entitled Electrical Transducing and owned by the assignee of this application. Preferably cam 25 supports head 22 in successive ones of four vertical positions corresponding to the scanning of respective ones of four pairs of tracks as shaft 26, to which cam 25 is attached, rotates through 90 degrees increments. The other end of shaft 26 carries a ratchet 31 that is actuated by the pawl end 32 of the rear end of the solenoid 21 plunger following deenergization of solenoid 21 and return to the rest position by spring 33. Energization of solenoid 21 is accompanied by expulsion of the front end of the solenoid plunger, causing front pawl 34 to advance gear 35 a quarter turn and correspondingly advance indicating wheel 23 by the same amount to display an appropriate channel number in window 13. A rear pawl 36 keeps gear 32, and consequently shaft 26 and cam 25, stationary except when solenoid 21 is pulsed.

Numerous other techniques may be employed for effecting the visual display of the channel track within the scope of the invention. For example, electromechanical techniques may be used in which appropriate switches close an electrical circuit or circuits to mechanically position an indicating member or to ignite a bulb associated with the particular channels scanned or other visible identifier, such as a "nixie" tube. The specific technique described in detail herein is especially advantageous because the indicating feature is obtained with exceptionally low additional cost, essentially that for the plunger front pawl 34, the front ratchet 35, the front pawl 37 and the indicating wheel 23 with associated supports, the added parts being relatively easy and inexpensive to install while operating reliably and requiring little power to continuously indicate the channel then being scanned.

It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

The embodiments of the invention in which an exclusive property or privilege is claimed are defined as follows:

1. Apparatus for visually indicating the channel then being scanned by multiple parallel track magnetic tape scanning apparatus comprising, magnetic scanning head means for selectively scanning one of a plurality of channels on parallel track magnetic tape when the tape is moving relative to said magnetic scanning head means along a prescribed scanning direction, case means for supporting said magnetic head means and normally blocking the position of said magnetic head means from the view of a user of said magnetic tape scanning apparatus, head positioning means for selectively displacing in a direction orthogonal to said scanning direction said head means relative to the position normally occupied by the magnetic tape when being scanned to select one of said plurality of channels for scanning, channel indicating means responsive to a change in the displacement of said head means in said direction orthogonal for providing a corresponding change in the visible indication to said user of the channel then being scanned whereby said channel indicating means continuously provides a visible indication to said user of the channel then adapted to being scanned by said head means, a common source of mechanical power for both actuating said head positioning means and said channel indicating means, said common source of mechanical power comprising electrically energized solenoid means having first and second selectable positions, means responsive to said solenoid means moving toward said first position for causing one of relatively displacing said head means in said direction orthogonal and changing said indicating means, means responsive to said solenoid means moving toward said second position for causing the other of relatively displacing said head means in said direction orthogonal and changing said indicating means, said case means including front panel means visible to said user, said indicating means including a rotatable member viewable through window means in said front panel means indicative of the channel then adapted to being scanned, said head positioning means including rotatable cam means secured to a rotatable shaft coacting with first ratchet and pawl means and said solenoid means for relatively displacing said head means in said direction orthogonal in response to each electrical impulse applied to said solenoid means, and second ratchet and pawl means coacting with said solenoid means for angularly displacing said rotatable member by a fixed increment in response to each electrical impulse applied to said solenoid means.

2. Apparatus in accordance with claim 1 wherein said solenoid means comprises a linear solenoid having a translatable plunger means interposed between said first ratchet and pawl means and said second ratchet and pawl means for actuating one of said first and second ratchet and pawl means when translating to said first position and actuating the other of said first and second ratchet and pawl means when translating to said second position.

References Cited

UNITED STATES PATENTS

| | | | |
|---|---|---|---|
| 2,292,856 | 8/1942 | Woolf et al. | 274—11 |
| 2,422,143 | 6/1947 | Somers et al. | 179—100.2 |
| 2,468,198 | 4/1949 | Heller | 179—100.2 |
| 3,048,083 | 8/1962 | Rosenbaum | 88—28 |

FOREIGN PATENTS

| | | |
|---|---|---|
| 1,115,944 | 10/1961 | Germany. |

BERNARD KONICK, Primary Examiner

J. P. MULLINS, Assistant Examiner

U.S. Cl. X.R.

179—100.2